United States Patent [19]

Ludwig et al.

[11] Patent Number: 4,842,106
[45] Date of Patent: Jun. 27, 1989

[54] RATE CONTROLLABLE DAMPING MECHANISM

[75] Inventors: Howard R. Ludwig, Rancho Palos Verdes; John W. Haidler, Wilmington; Mark S. C. Yuan, Fountain Valley; Robert J. Elson, San Pedro, all of Calif.

[73] Assignee: Hughes Aircraft Company, Los Angeles, Calif.

[21] Appl. No.: 105,838

[22] Filed: Oct. 8, 1987

[51] Int. Cl.⁴ .......................... F16D 57/00; F16F 9/12; B64G 1/22; B64G 1/44
[52] U.S. Cl. ..................... 188/266; 16/48.5; 16/222; 188/268; 188/274; 188/276; 188/290; 188/306; 244/118.1; 244/137.1; 244/158 R; 267/195; 267/217; 267/136; 403/28; 403/32
[58] Field of Search .............. 188/290–296, 188/274, 277–278, 266, 268, 266, 322.5, 382, 276, 306–310; 403/32, 28; 244/158 R, 118.1, 137.1, 173; 236/101 R, 102; 267/182, 136, 223, 195, 217, 218, 228, 173; 16/48.5, 222; 70/DIG. 10; 292/DIG. 66

[56] References Cited

U.S. PATENT DOCUMENTS

| Re. 18,284 | 12/1931 | Lasier | 403/32 X |
|---|---|---|---|
| 2,426,039 | 8/1947 | McKune | 16/48.5 |
| 2,520,536 | 8/1950 | Feeley | 16/222 |
| 2,732,920 | 1/1956 | Newton | 16/48.5 |
| 2,790,520 | 4/1957 | Kuhn, Jr. | 188/307 |
| 2,954,106 | 9/1960 | Schlage | 16/48.5 |
| 3,089,568 | 5/1963 | Thompson | 16/48.5 |
| 3,454,286 | 7/1969 | Anderson et al. | 403/28 X |
| 3,672,475 | 6/1972 | Nash | 188/306 X |
| 3,981,598 | 9/1976 | Taulier et al. | 403/32 X |
| 4,561,614 | 12/1985 | Olikara et al. | 188/306 X |
| 4,578,920 | 4/1986 | Bush et al. | 244/173 X |
| 4,596,483 | 6/1986 | Gabriel | 403/32 X |
| 4,610,180 | 9/1986 | Spease | 403/32 X |
| 4,632,339 | 12/1986 | Yuan | 244/158 R |
| 4,653,141 | 3/1987 | Converse | 188/306 X |

Primary Examiner—Douglas C. Butler
Attorney, Agent, or Firm—Steven M. Mitchell; Mark J. Meltzer; A. W. Karambelas

[57] ABSTRACT

A rate controllable damping mechanism is disclosed. The mechanism includes a chamber disposed within a housing; an element mounted for movement within the chamber; a damping material, preferably a low melting temperature metal alloy, in the chamber for preventing the movement of the element at a first temperature and for damping the movement of the element at a second temperature; and a heater for selectively increasing the temperature of the damping material from the first temperature to the second temperature. Controlled damping is effectuated by heating the fluid material until it reaches a molten state at which the resultant fluid damps the movement of the element in a conventional manner. A novel method is also disclosed for structural stress relief.

7 Claims, 3 Drawing Sheets

RATE CONTROLLABLE DAMPING MECHANISM

This invention was made with Government support under Contract No. BAL-4830 awarded by the Government. The Government has certain rights in this invention.

BACKGROUND OF THE INVENTION

1. Field of the Invention

The present invention relates to damping apparatus. In particular, the present invention relates to damping apparatus as in the deployment mechanisms of spacecraft.

While the present invention is described herein with reference to a particular embodiment or illustration, it is understood that the invention is not limited thereto. Those of ordinary skill in the art, having access to the teachings provided herein, will recognize additional modifications, applications and embodiments within the scope of the invention.

2. Description of the Related Art

As is well known, conventional rotary damping mechanisms employ a paddle mounted on a shaft for movement within a chamber filled with a damping fluid. As the shaft is rotated within the housing the fluid flows from one side of the paddle to the other through a small gap between the paddle and the housing. This action provides a damping force proportional to velocity and hence the rate of deployment can be limited.

A damping and deployment mechanism is typically a damping mechanism fitted with an actuator, typically a spring, and a latch. Thus, the spring provides the actuation force which is damped by the damping mechanism. The damping and deployment mechanism will experience a controlled motion to the end of travel at which time the latches will engage and hold the mechanism in its deployed position.

Unfortunately, these mechanisms typically have several shortcomings of which the leakage of damping fluid is but one example. In many applications, leakage of damping fluid may be tolerated; however, in certain more demanding applications, this leakage may be problematic. For example, in space and other remote environments, leakage of fluid from a damping mechanism in a deployment system may cause enough damage to impact on the success or failure of the mission. That is, the leakage may reduce the damping capacity of the mechanism and allow a substantial force to be applied to the spacecraft structure, due to increased impact velocities, causing breakage of and damage to critical system components. This may also lead to contamination of adjacent spacecraft components. Thus, durable, reliable operation of such damping and deployment mechanisms is often a design objective of high priority as maintenance, repair, and replacement may be quite costly or impossible.

Another typical shortcoming of conventional damping and deployment mechanisms is that the mechanism is typically constrained to latch in a fixed position. In some applications, there is a need to latch, albeit temporarily, in some intermediate position. Thus, variable latching, the capability to latch in any position within the range of movement of the deployment arm, is deemed to be desirable.

Further, there is typically no provision for varying the rate of deployment of structures using conventional deployment mechanisms. It is considered to be desirable that the rate and degree of deployment be controlled. This would permit the use of more powerful actuators (heavier springs) and still control the deployment rate.

Also, conventional damping mechanisms do not add to the stiffness of the deployed systems. That is, once the deployment is complete, only a latch prevents the joint from becoming fluid again. It would be advantageous to provide a stronger joint than is typically characteristic in a simple latch.

Further, conventional systems are gap dependent. That is, the damping rate is typically a function of the gap between the paddle and the walls of the chamber through which the fluid must flow. The need to control the dimensions of these gaps adds significantly to the cost of manufacture of conventional deployment mechanisms.

There is, therefore, a need in the art for a simple, low cost improved damping and deployment mechanism that is less likely to leak; offers variable latching; is rate controllable; is load independent; and adds to the stiffness of the deployed system.

SUMMARY OF THE INVENTION

The shortcomings of conventional mechanisms are addressed by the rate controllable damping mechanism of the present invention. The mechanism includes a chamber disposed within a housing; an element mounted for movement within the chamber; a damping material (preferably a low melting temperature metal alloy) is disposed within the chamber for preventing the movement of the element at a first temperature below melting point and for damping the movement of the element at a second (melting) temperature; and a heater for selectively increasing the temperature of the damping fluid from the below the melting point to the melting point and supplying the latent heat of fusion. Controlled damping is effectuated by varying the rate of fusion. As the solid melts motion is allowed between the paddle and the housing. The rate of deployment is then dependent on the rate at which melting occurs.

A novel method is also disclosed for structural stress relief.

DESCRIPTION OF THE INVENTION

Figure 1A:
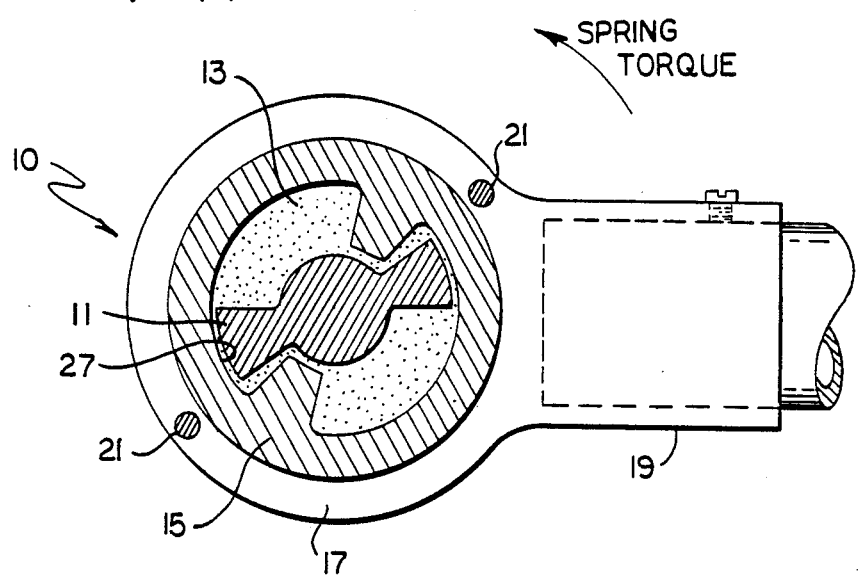
FIG. 1(a) shows a side view, partially in section, of a damping mechanism constructed in accordance with the teachings of the present invention in a first predeployment position.
Figure 1B:
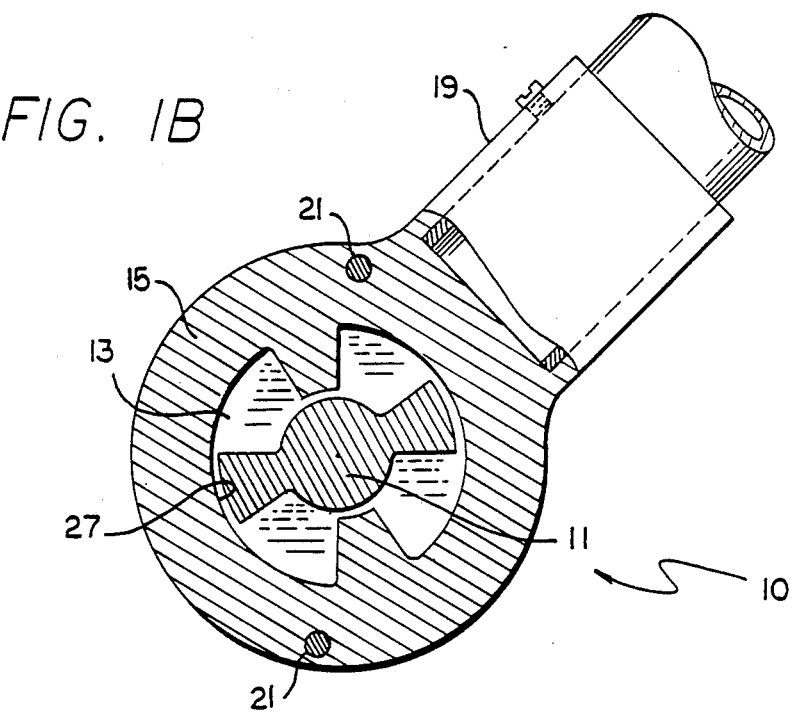
FIG. 1(b) shows a side view, partially in section, of the damping mechanism of FIG. 1(a) in a partially deployed position.

Illustrative embodiments and exemplary applications will now be described with reference to the accompanying drawings to disclose the advantageous teachings of the present invention. FIGS. 1(a) and 1(b) show partial sectional side views of a rate controllable damping mechanism 10 constructed in accordance with the teachings of the invention. FIG. 1(a) shows the mechanism 10 in a pre-deployment or stowed position and FIG. 1(b) shows the mechanism 10 in a deployed position. Although, as discussed below, the mechanism 10 of FIGS. 1(a) and 1(b) is adapted for angular rotation, it will be understood that the teaching of the present invention is equally applicable to damping mechanisms employing translational motion. The mechanism 10 of the present invention includes a stator or paddle wheel 11 mounted for relative rotational motion within a chamber filled with a low temperature melting metal alloy 13 such as "Cerrobend" provided by Cerro Metal Products Corporation of Bellefonte, Penn. As discussed below, and not shown in FIGS. 1(a) or (b), the stator 11 is attached to a housing which is in turn attached to a frame. A rotor 15 surrounds the chamber and is attached to a hub 17 which, in turn, is attached to a shaft 19. A rod or coil of the heating element 21 are fixed in the hub 17, although it will be recognized by those skilled in the art that the heating element 21 could be placed in other suitable locations. It is also understood that any suitable heating element or mechanism may be used without departing from the scope of the invention.

Figure 2A:
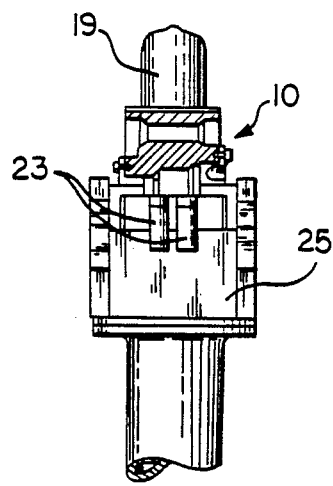
FIG. 2(a) shows a front view of the damping mechanism of FIG. 1(a) in the partially deployed position.
Figure 2B:
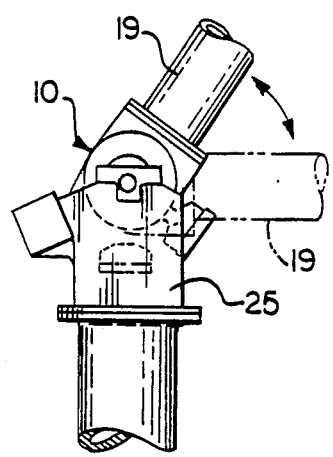
FIG. 2(b) shows a side elevational view of the damping mechanism of FIG. 2(a) with the predeployed position in phantom lines.

The selective activation of the heating element 21 provides control of the rate of actuation (or deployment) and of the latching position. When the heating element 21 is activated and the alloy 13 reaches its melting point, redundant springs 23, shown in the front view of FIG. 2(a) and positioned between the shaft 19 and the frame 25, move the shaft 19 from the stowed position of FIG. 1(a) to the deployed position of FIG. 1(b). See also FIG. 2(b). As the stator 11 and the rotor 15 undergo relative rotation, the molten metal flows from one side of the stator 11 to the other side through a gap 27 between the stator 11 and the rotor 15 as shown in FIG. 1(a). The present invention thus provides damped actuation at a rate which may be controlled electrically from a remote location. Further, since the metal in its solid state contributes to the overall stiffness of the deployed mechanism, the invention allows for the use of a smaller joint to achieve the same degree of stiffness.

Since the damping is not based on viscosity and gap size, the present invention is gap independent relative to the prior art. That is, the gap size of the present invention is not critical with respect to damping rate. Fabrication is simplified as the gaps need not be machined with the precision necessitated by prior art designs.

While these considerations simplify the design and manufacture of the present invention, it will be recognized that one of the principal advantages of the present invention is that it is not subject to leakage. No fluid is present in the chamber until the alloy 13 is liquified by heating. At which time, if any leakage occurs, the escaping liquid will solidify when exposed to the external environment and will not spread and contaminate adjacent components as fluid. The advantageous features mentioned above presume that the actuator is otherwise designed within the level of skill in the art vis-a-vis the intended operational environment.

Figure 4:
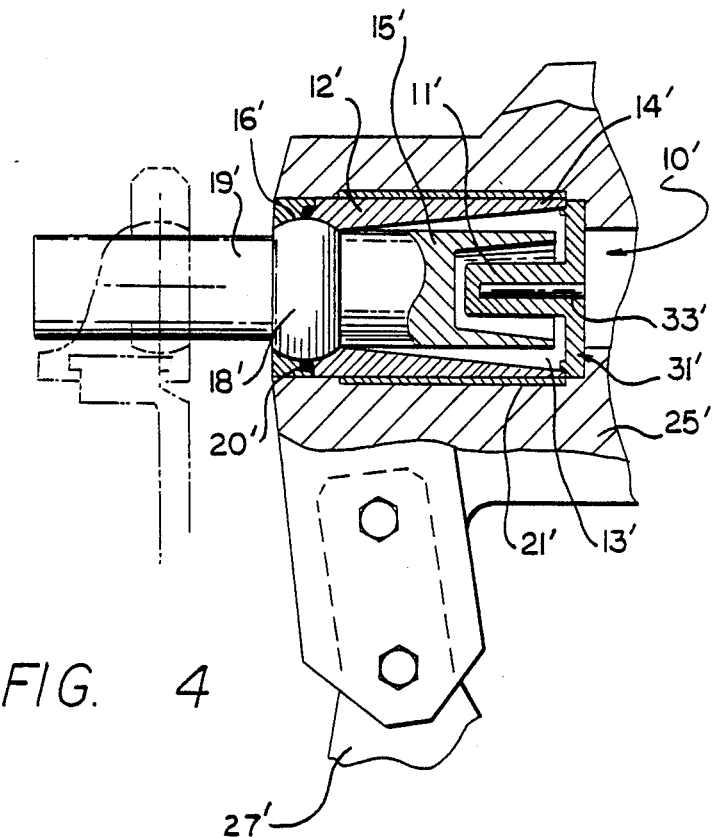
FIG. 4 shows a sectional side view of a strain relief mechanism constructed in accordance with the teachings of the present invention.
Figure 3:
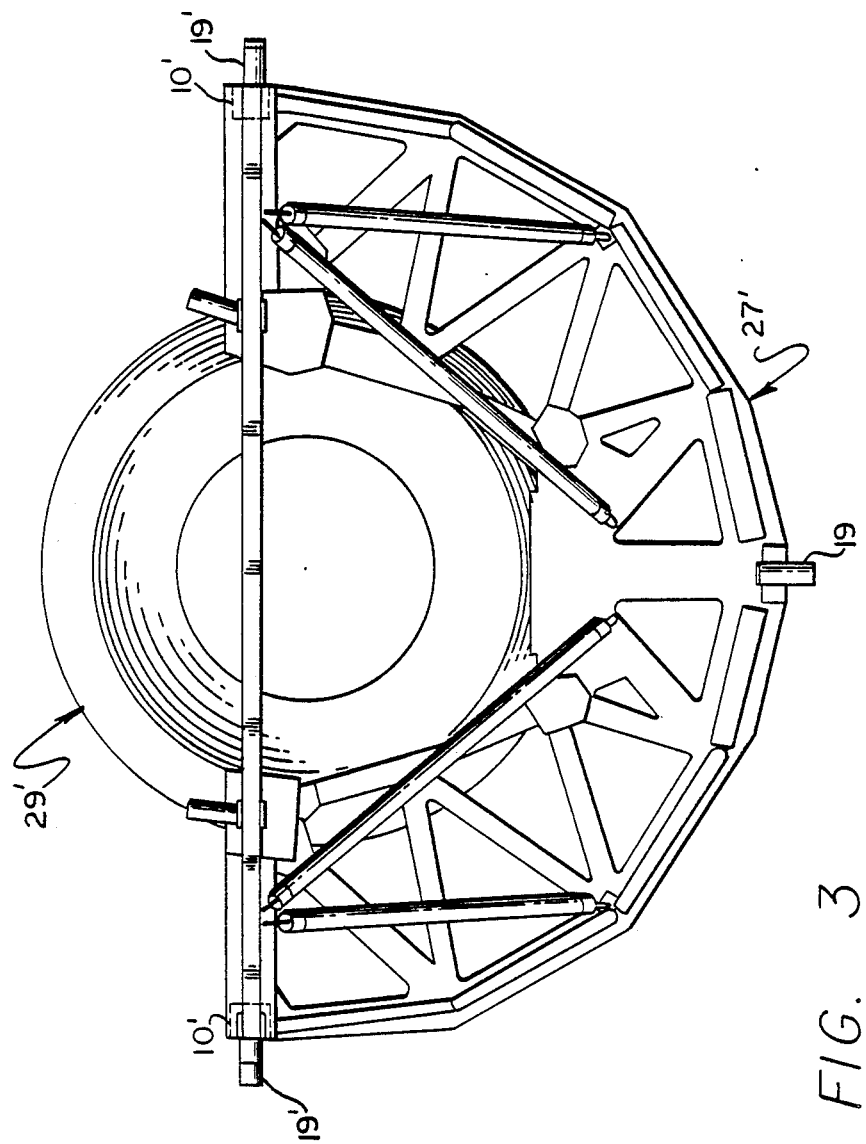
FIG. 3 shows an illustrative application of a strain relief mechanism constructed in accordance with the teachings of the present invention.

FIGS. 3 and 4 illustrate a novel application employing the teachings of the present invention. In this application, one or more strain relief mechanisms 10', constructed in accordance with the teachings of the present invention, are strategically positioned in a spacecraft cradle 27'. The cradle 27' supports a satellite payload 29'. The strain relief mechanism 10' is shown in detail in the partial sectional view of FIG. 4. In this embodiment, the mechanism 10', shown in section, includes a substantially cylindrical housing 12' which is surrounded by a heating element 21' and secured within a frame 25'. The housing has a flared contour 14' at one end and a socket 16' at the other. The socket 16' provides a seat for the ball 18' on the shaft 19' The socket is fitted with an O-ring seal 20'. The flared end of the housing 12' provides a chamber into which one end of the shaft 19' extends. The end of the shaft 19' is a rotor or paddle 15'. The paddle 15' is hollowed to receive the stator 11' which in this embodiment is a protrusion from a housing end cap 31'. The other end of the shaft is attached to the transport vehicle, e.g. the shuttle. The end cap 31' is fastened to the housing 12'. A thermostat 33', embedded in the stator 11', regulates the heater 21'. The chamber is filled with the low melting temperature metal alloy 13', or other suitable material, as discussed above. Each mechanism 10' is secured within the frame 25' which is a part of the cradle 27'.

With the exception of the springs 23, the operation of each strain relief mechanism 10' is substantially identical to that described above with reference to the illustrative embodiment 10 of FIGS. 1 and 2. That is, the activation of the heating element 21' melts the alloy 13' and allows movement of the paddle 15' relative to the housing 12'.

The novel technique for structural stress relief afforded by the present invention may now be described with reference to the illustrative application of FIG. 3. It will be understood that the invention may be applied to any structure by those of ordinary skill in the art. The first step in the method has already been taken with respect to the cradle of FIG. 3, that is, the structure is fitted with a plurality of stress relief mechanisms 10' at selected support positions. Initially, the heating elements 21' are off so that the metal alloys 13' of each mechanism are solidified. The structure is next exposed to internal and external forces which provide steady state and perhaps transient stresses and strains on the structure. In the case of the cradle, this means launching the shuttle and exposing the cradle to the launching and space environment. Next, the heating elements 21' of each mechanism 10' are energized. When the alloys 13' melt, the structure relaxes and the strains are relieved. Finally, the heating elements 21' are deactivated and the alloys solidify to provide rigid supports. In the illustrative application, the payload satellite may then be ejected from the cradle 27'.

Thus, the present invention has been described with reference to illustrative embodiments for illustrative and in fact novel applications. Nonetheless, the invention is not limited thereto. Those of ordinary skill in the art having access to the teachings provided herein will recognize additional modifications, applications and embodiments within the scope of the invention. For example, the invention is not limited to the design of the rotor and stator nor that of the paddle and chamber. Nor is the invention limited to the type, shape, or location of the heating element. The invention is not limited to the material used as a damping fluid so long as it melts and freezes (or fuses and solidifies) within the designed operating temperatures. The invention is not limited to the means used to actuate the deployment mechanism 10. In fact, the relief mechanism 10' illustrates that no actuating mechanism is required. It is therefore intended by the appended Claims to cover any and all modifications, applications, and embodiments within the scope of the invention.

Accordingly,
What is claimed is:

1. An improved damping and strain relief mechanism comprising:
   a chamber disposed within a housing;
   paddle means mounted for movement within said chamber;
   a damping material disposed within said chamber, said damping material being a solid, for preventing the movement of said paddle means at a first temperature and, said damping material being a liquid, for damping the movement of said paddle means at a second temperature; and
   heating means for selectively increasing the temperature of said damping material from said first temperature to said second temperature.

2. The improved damping and strain relief mechanism of claim 1 wherein said damping material is a low melting temperature metal alloy.

3. The improved damping and strain relief mechanism of claim 2 wherein said heating means is an electrical heater.

4. The improved damping and strain relief mechanism of claim 1 including means for actuating said paddle means.

5. A method for structural stress relief comprising the steps of:
   (a) mounting the structure on a support through a plurality of strain relief mechanisms, each mechanism including a chamber disposed within a housing; paddle means mounted for movement within said chamber; a damping material disposed within said chamber for preventing the movement of said paddle means at a first temperature and for damping the movement of said paddle means at a second temperature; and heating means for selectively increasing the temperature of said damping material from said first temperature to said second temperature;
   (b) exposing the structure to strain forces; and
   (c) activating the heating means of each relief mechanism to allow the structure to relax under the strain forces.

6. A method for relieving stress on a spacecraft cradle comprising the steps of:
   (a) mounting the cradle within a transport vehicle through a plurality of strain relief mechanisms, each mechanism including a chamber disposed within a housing; paddle means mounted for movement within said chamber; a damping material disposed within said chamber for preventing the movement of said paddle means at a first temperature and for damping the movement of said paddle means at a second temperature; and heating means for selectively increasing the temperature of said damping material from said first temperature to said second temperature;
   (b) launching said transport with said cradle and a satellite within said cradle as the payload of said transport;
   (c) activating the heating means of each relief mechanism to allow the cradle to relax; and
   (d) ejecting the satellite from said cradle.

7. An improved damping and strain relief mechanism comprising:
   a stator having first and second wing shaped protusions therefrom;
   a rotor including a chamber adapted to receive said stator therein, said rotor including first and second protrusions adapted to engage said first and second wings of said stator as said rotor rotates relative to said stator;
   a damping material disposed within said chamber, said damping material being a solid, for preventing the movement of said rotor relative to said stator at a first temperature and, said damping material being a liquid, for damping the movement of said rotor relative to said stator at a second temperature; and
   heating means for selectively increasing the temperature of said damping material from said first temperature to said second temperature.

* * * * *